US006909996B2

(12) United States Patent
Huang et al.

(10) Patent No.: US 6,909,996 B2
(45) Date of Patent: Jun. 21, 2005

(54) ONLINE MATERIAL CONSUMPTION MONITORING SYSTEM AND METHOD FOR MONITORING MATERIAL WITHIN A WAFER FABRICATION FACILITY

(75) Inventors: Allison Huang, Hsin-Chu (TW); Chih-Tsong Lin, Hsin-Chu (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 90 days.

(21) Appl. No.: 10/387,071

(22) Filed: Mar. 12, 2003

(65) Prior Publication Data

US 2004/0181371 A1 Sep. 16, 2004

(51) Int. Cl.[7] ................................ G06F 11/34
(52) U.S. Cl. ...................... 702/188; 702/179; 702/183; 702/186
(58) Field of Search ................ 700/106, 108, 700/115, 116, 121, 122; 702/67, 69, 104, 117, 134, 176; 438/9; 716/4

(56) References Cited

U.S. PATENT DOCUMENTS

| 6,526,547 B2 * | 2/2003 | Breiner et al. ................ 716/4 |
| 2003/0009430 A1 * | 1/2003 | Burkey et al. ................ 707/1 |
| 2003/0225474 A1 * | 12/2003 | Mata et al. ................ 700/121 |

FOREIGN PATENT DOCUMENTS

TW             495819         5/2001

* cited by examiner

Primary Examiner—Marc S. Hoff
Assistant Examiner—Felix Suarez
(74) Attorney, Agent, or Firm—Tung & Associates

(57) ABSTRACT

An online monitoring system is provided having a computer having a GUI having a build of material display; a material warehouse in communication with a manufacturing execution system ("MES") for controlling execution of a plurality of recipes used to make an associated product; a capacity consumption system ("CCS") for determining future processing capacity within a wafer fabrication facility in accordance with a total material consumption algorithm. A method of use having the steps of:

providing a representative material for consumption within a fabrication facility;

calculating a total amount of the representative material consumed within a wafer fabrication facility in accordance with a material consumption algorithm, wherein the material consumption algorithm is calculated using a plurality of variables; and benchmarking material usage by each piece of fabrication equipment disposed within one or a plurality of fabrication facilities to help plan for future material usage and to improve fabrication production.

20 Claims, 4 Drawing Sheets

| | 62 | 64 | 66 | 68 | 70 | 72 |
|---|---|---|---|---|---|---|
| | EQUIPMENT TYPE | RECIPE ID | PROCESS | PRODUCT TYPE | PRODUCT ID | PRODUCT QTY. |
| | BPHOTO | BPHC10 | PR | PFI-26A9 | L203100 | 2.5 |
| | BPD | BCTPD1 | PR | I-8320A | L230050 | 5.8 |
| | BPD | BCTPD2 | PR | I-8320A | L230050 | 5.8 |
| | BPD | BDVPD0 | DEV | A-515 | L243050 | 35 |

*Figure 2*

| 75 | 77 | 79 | 81 | 83 |
|---|---|---|---|---|
| MN | FIXED AMOUNT | MATERIAL ID | MATERIAL TYPE | % AMOUNT |
| | | | | |
| | | | | |
| | | | | |
| | | | | |
| | | | | |

| MATERIAL | FORECAST (MAY) 90 | | FORECAST (APR) 92 | | STANDARD 86 | | ACTUAL 82 | | Fcst vs ACTUAL 110 | | STANDARD vs ACTUAL 112 | |
|---|---|---|---|---|---|---|---|---|---|---|---|---|
| | AMT (K) | U/C | AMT (K) | U/C | AMT (K) | U/C | AMT (K) | U/C | AMT (K) | U/C | AMT (K) | U/C |
| M1(POLY) | 583 | 15 | 588 | 13 | 512 | 16 | 645 | 20 | 57 | 7 | 133 | 4 |

MATERIAL USAGE TREND ANALYSIS

| | | FORECAST ACCURACY | |
|---|---|---|---|
| | | HIGH | LOW |
| STD ACCURACY | HIGH | GOOD CONTROL | MOVE PLAN ISSUE, KEEP SAFETY STOCK |
| | LOW | ABNORMAL, USERS NEED TO CLARIFY THE USAGE RAGE | NEED IMPROVEMENT, CLARIFY USAGE RATE & KEEP SAFETY STOCK |

*Figure 5*

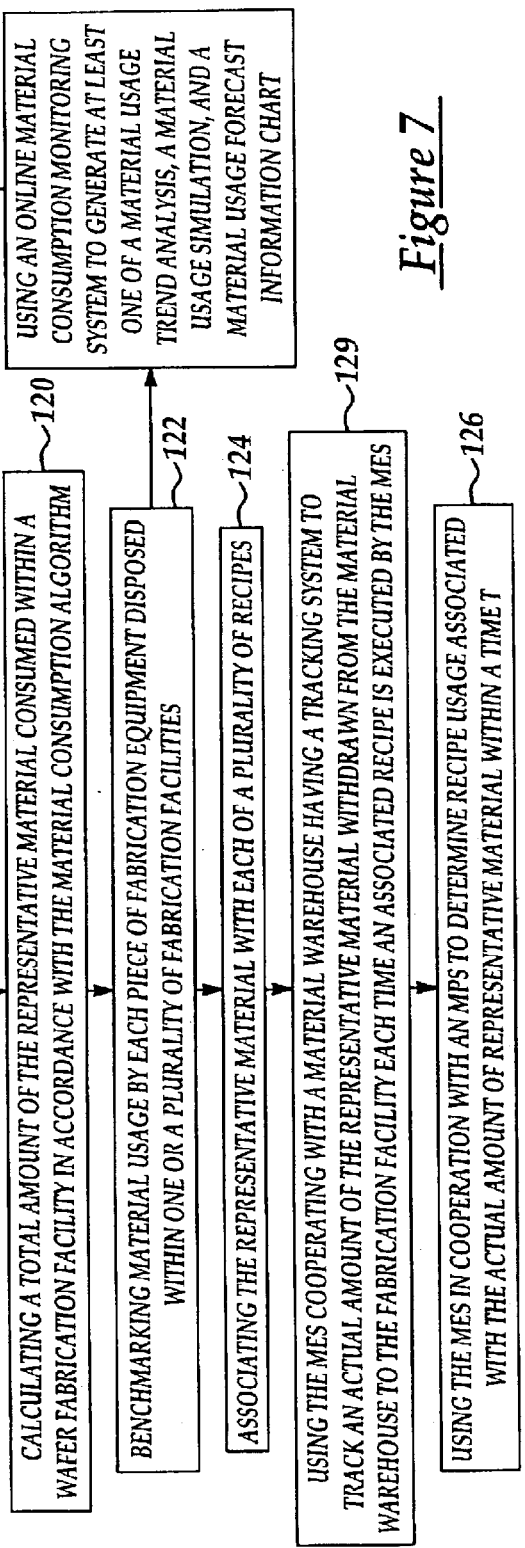

ONLINE MATERIAL CONSUMPTION MONITORING SYSTEM AND METHOD FOR MONITORING MATERIAL WITHIN A WAFER FABRICATION FACILITY

FIELD OF THE INVENTION

The present invention relates to an online material consumption monitoring system and method for monitoring material within a wafer fabrication facility.

BACKGROUND

It is necessary to calculate actual consumption of both direct and indirect materials in order to meet the demands required to perform real operations within a wafer fabrication facility. Currently, it is difficult to account for actual consumption of indirect materials such as gas, photo-resist, or slurry other materials used in a wafer fabrication process such as in a chemical-mechanical-polishing (CMP) process.

There is a lack of sufficient information to forecast material usage from the supply side of production due to a lack of information from vendors supplying materials, and from the demand side due to major product mix changes, recipe changes, and new products being mass produced in a rapidly changing high technology market such as the semiconductor or wafer fabrication industry. Thus, current material planning scheduling is not device or quantity sensitive and major product mix changes could result in bias forecasting.

Existing systems do not provide for a standard consumption database and procedure to track material consumption; additionally, there is no mechanism to maintain standard material consumption data, especially for new products. Existing systems also do not provide a standard planning method thus, resulting in arbitrary material consumption data results. Additionally, current material planning systems involve double work for material planning departments and engineering departments because there is not a central system available to backup the planning process for material consumption.

Thus, existing systems use intensive manual and fragmented processes to define material usage and forecasts, and therefore result in unnecessary wastage of material and associated manufacturing and accounting costs.

It is desirable to provide a method that measures cost and performance of both direct and indirect materials based on each materials' use in production.

It is desirable to use business process reengineering to refine the user operation flow in order to improve the traceability of material usage in wafer processing.

It is desirable to build up a build of materials for recipes defining what materials are used and defining an actual material usage structure of material within a recipe.

It is desirable to provide a system that provides reliable forecasting and budgeting by closely connecting materials demand to a master planning schedule ("MPS").

SUMMARY OF THE INVENTION

In general, an online monitoring system is provided having a computer having a GUI having a build of material display; a material warehouse in communication with a manufacturing execution system ("MES") for controlling execution of a plurality of recipes used to make an associated product; a capacity consumption system ("CCS") for determining future processing capacity within a wafer fabrication facility in accordance with a total material consumption algorithm.

The present invention provides a Material Planning Management System (MPM) to provide a uniform model and consistent data for a wafer fabrication planner and fabrication equipment engineers to generate actual, standard, and forecast material consumption.

The present invention saves time, manual efforts, and enables unification of information amount various departments disposed within a foundry or a wafer fabrication facility.

The present invention uses MPS data to calculate material forecast usage as a forecast data source for material requirement planning (MRP) in an Enterprise Resource Planning ("ERP") system.

The present invention uses a material planning management system ("MPMS") to construct a standard methodology and to provide a web user interface for a user to review the structure of a recipe and material more easily.

The present invention solves client deployment issues for a system administrator and reduces the urgency of installation of client applications for users.

Referring now in more detail, the present invention provides an on online material consumption monitoring system for monitoring material within a wafer fabrication facility, the online material consumption monitoring system having:
  a) a computer having
    (i) a controlling processor capable of processing material consumption data,
    (ii) a graphical user interface having a build of material ("BOM") display,
    (iii) a browser used to access the graphical user interface and
    (iv) an associated memory means for storing the browser;
  b) a material warehouse having an automated tracking system for tracking each move of a pre-defined amount of at least one representative material from the material warehouse to a piece of fabrication equipment disposed within a wafer fabrication facility, the automated tracking system in operable communication with the controlling processor;
  c) a manufacturing execution system ("MES") for controlling execution of each of a plurality of recipes used to make an associated product, wherein the MES is in operable communication with at least one of the material warehouse automated tracking system and the controlling processor; and
  d) a capacity consumption system ("CCS")for determining future processing capacity of each piece of fabrication equipment disposed within a wafer fabrication facility, the CCS capable of generating a master production schedule ("MPS") associated with at least one of a current, a standard, and a future scheduled recipe move; wherein the controlling processor operates to acquire material move data from the material warehouse and to acquire a recipe usage number associated with the pre-defined amount of at least one representative material from at least one of the MES and the CCS to calculate total material consumption of representative material within a wafer fabrication facility.

Additionally, the present invention further provides a method of using an online monitoring system in accordance with one embodiment of the present invention. The method having the steps of:

a) providing a representative material to be consumed within a fabrication facility;

b) calculating a total amount of the representative material consumed within a wafer fabrication facility in accordance with a material consumption algorithm, wherein the material consumption algorithm is calculated using a plurality of variables; and c) benchmarking material usage by each piece of fabrication equipment disposed within one or a plurality of fabrication facilities to help plan for future material usage and to improve fabrication production.

Additionally, in accordance with an alternative preferred embodiment of the present invention, a method using the online material consumption monitoring system disclosed herewithin for monitoring material within a fabrication facility, the method has the steps of:

a) providing a representative material to be consumed within a fabrication facility;

b) calculating a total amount of the representative material consumed within a wafer fabrication facility in accordance with a material consumption algorithm, wherein the material consumption algorithm is calculated using a plurality of variables;

c) associating the representative material with each of a plurality of recipes, wherein the representative material associated with each of the plurality recipes is consumed within the fabrication facility each time a recipe is executed by the MES;

d) using the MES cooperating with the material warehouse tracking system to track an actual amount of the representative material moved from the material warehouse to the fabrication facility each time an associated recipe is executed by the MES;

e) using the MES in cooperation with an MPS to determine recipe usage associated with the actual amount of representative material within a time T; and f) benchmarking material usage by each piece of fabrication equipment disposed within one or a plurality of fabrication facilities to help plan for future material usage and to improve fabrication production.

BRIEF DESCRIPTION OF THE DRAWINGS

These and other objects, features and advantages of the present invention will become apparent from the following detailed description and the appended drawings in which:

FIG. 2 is a graphical illustration of a BOM display within a GUI in accordance with the present invention.

FIG. 3 is a graphical illustration of a material usage subdisplay in accordance with the present invention.

FIG. 4 is a graphical illustration of a material usage simulation chart in accordance with the present invention.

FIG. 5 is a graphical illustration of a material usage trend analysis in accordance with the present invention.

FIG. 6 is a material usage forecast in accordance with the present invention.

FIG. 7 is a flowchart showing a method of using an online material consumption monitoring system in accordance with the present invention.

DETAILED DESCRIPTION OF THE PREFERRED EMBODIMENTS

The present invention provides a Material Planning Management System (MPM) to provide a uniform model and consistent data for a wafer fabrication planner and fabrication equipment engineers to generate actual, standard, and forecast material consumption.

In general, an online monitoring system is provided having a computer having a GUI having a build of material display; a material warehouse in communication with a manufacturing execution system ("MES") for controlling execution of a plurality of recipes used to make an associated product; a capacity consumption system ("CCS") for determining future processing capacity within a wafer fabrication facility in accordance with a total material consumption algorithm.

The system further provides a database that integrates a forecast with actual move of recipes within a fabrication facility.

A method of use is also provided having the steps of:

providing a representative material for consumption within a fabrication facility;

calculating a total amount of the representative material consumed within a wafer fabrication facility in accordance with a material consumption algorithm, wherein the material consumption algorithm is calculated using a plurality of variables; and benchmarking material usage by each piece of fabrication equipment disposed within one or a plurality of fabrication facilities to help plan for future material usage and to improve fabrication production.

The present invention saves time, manual efforts, and enables unification of information amount various departments disposed within a foundry or a wafer fabrication facility.

The present invention uses MPS data to calculate material forecast usage as a forecast data source for material requirement planning (MRP) in an Enterprise Resource Planning ("ERP") system.

The present invention uses a material planning management system ("MPMS") to construct a standard methodology and to provide a web user interface for a user to review the structure of a recipe and material more easily.

The present invention solves client deployment issues for a system administrator and reduces the urgency of installation of client applications for users.

Figure 1:
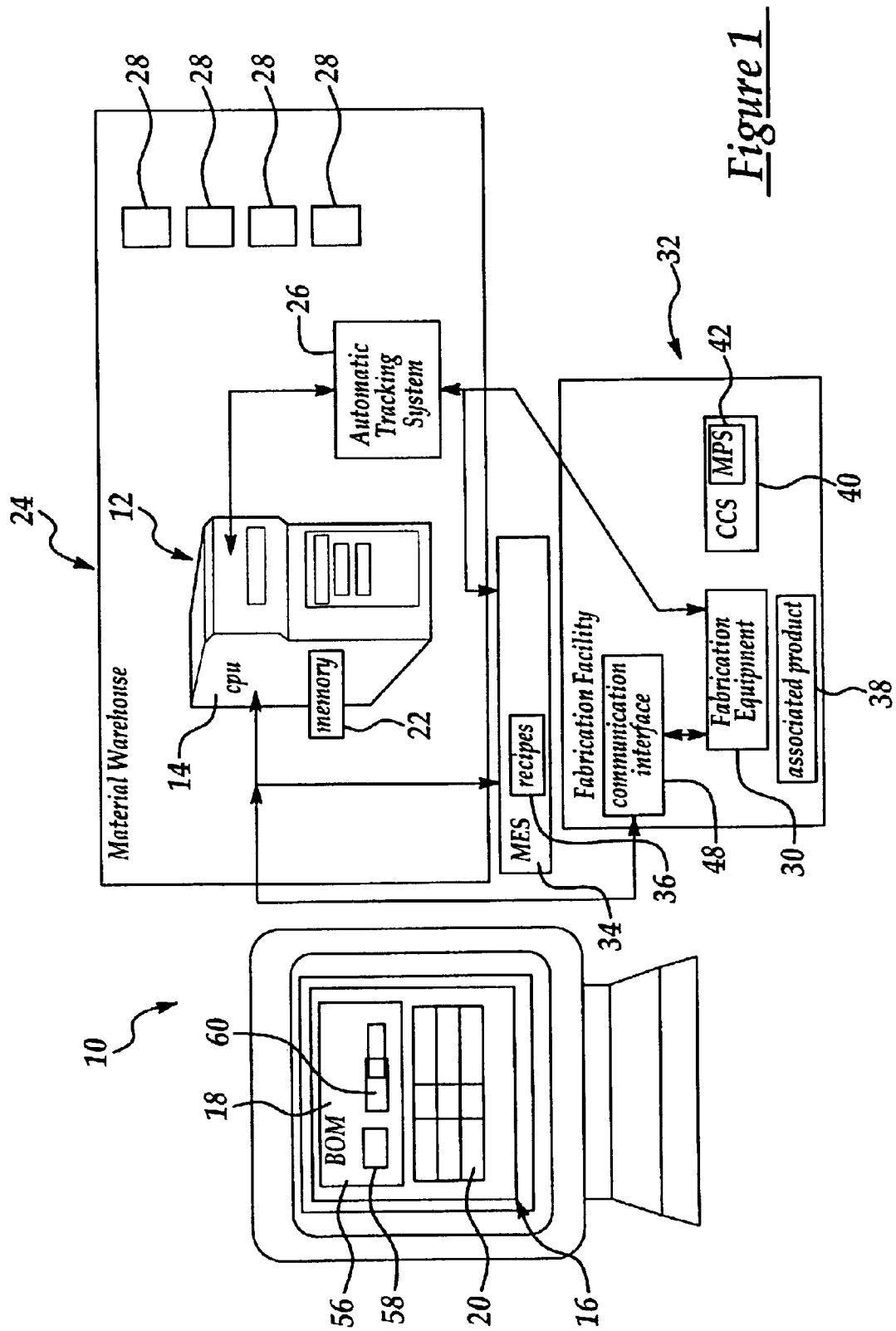
FIG. 1 is a block diagram overview of an online material consumption management system.

Referring now in more detail to the figures, FIG. 1 illustrates a block diagram of an online material consumption monitoring system 10 for monitoring material consumption within a wafer fabrication facility, the online material consumption monitoring system having:

a) a computer 12 having
   (i) a controlling processor 14 capable of processing material consumption data,
   (ii) a graphical user interface 16 ("GUI") having a build of material display 18,
   (iii) a browser 20 used to access the GUI 16, and
   (iv) an associated memory means 22 for storing the browser 20;

b) a material warehouse 24 having an automated tracking system 26 for tracking each move of a pre-defined amount of at least one representative material 28 from the material warehouse 24 to a piece of fabrication equipment disposed within a wafer fabrication facility 32, the automated tracking system 26 in operable communication with the controlling processor 14;

c) a manufacturing execution system ("MES") 34 for controlling and tracking execution of each of a plurality of recipes 36 used to make an associated product 38, wherein the MES 34 is in operable communication with at least one of the material warehouse automated tracking system 26 and the controlling processor 14; and d) a capacity consumption system ("CCS") 40 for determining future processing capacity of each piece of fabrication equipment disposed within a wafer fabrication facility, the CCS 40 capable of generating a master production schedule ("MPS") 42 associated with at least one of a current, a standard, and a future scheduled recipe move;

wherein the controlling processor 14 operates to acquire material move data from the material warehouse 24 and to acquire a recipe usage number 44 associated with the pre-defined amount of at least one representative material 28 from at least one of the MES 34 and the CCS 40 to calculate total material consumption of representative material within a wafer fabrication facility using a total material consumption algorithm.

In accordance with one embodiment of the present invention, as shown in FIG. 1, the online material consumption monitoring system 10 further preferably has:

a) at least one piece of fabrication equipment 30 in operable communication with the computer 12, the at least one piece of fabrication equipment 30 having at least one wafer processing device 46 in further operable communication with the at least one piece of fabrication equipment 30; and b) a communication interface 48 for interfacing communication between the at least one piece of fabrication equipment 30 and the computer 12.

The at least one representative material 28 is preferably selected from the group consisting of an indirect material (not shown) 50 consumed in the indirect processing of an associated product but not consumed within the associated product and a direct material 52 (not shown) directly consumed within an associated product, preferably wherein each product 38 having an associated recipe 36 used to make the associated product consumes a percentage of the direct material 52. An example of the indirect material 50 may be a slurry used in a chemical-mechanical polishing operation used to process a wafer but not actually consumed within the wafer composition.

The graphical user interface 16 provides a configurable interface for a user of the computer 12. The GUI 16 further has a BOM display 56 for displaying BOM data 58 and a material consumption summary display 60 for displaying a plurality of material consumption user-defined graphical display formats.

In accordance with a preferred embodiment, as shown in FIGS. 2–3, the BOM display 56 of the GUI 16 has:

a plurality of columns 62, 64, 66, 68, 70, 72, the plurality of columns having associated pre-programmed BOM data fields along with a plurality of additional fields into which a user may input BOM data, the plurality of columns having at least one of an equipment type column 62, a recipe id column 64, a process column 66, a product type column 68, a product id column 70, and a product quantity column 72, wherein the BOM display 56 can be dynamically updated in accordance with a change of at least one of an equipment type a recipe id, a process id, a product type, a product id, and a product quantity; and a material usage subdisplay 74 (shown in FIG. 3).

As shown in FIG. 1, the browser 20 preferably is a java-plug-in installed browser, wherein the browser preferably has a Java applet embedded therewithin for maintaining the BOM data disposed within the associated pre-programmed BOM data fields along and within the plurality of additional fields and material consumption data, wherein the BOM data and material consumption data is dynamically accessed via web-based query reports. However, the browser 20 may be any type of browser well known in the computer arts for accessing a GUI and may optionally be associated with a program capable of maintaining data disposed within a GUI.

The controlling processor 14 cooperates with the graphical user interface 16 to selectively process the BOM data embedded within the browser 20 by performing an associated material consumption algorithm using a move number (MN), a backup amount (B), a recipe usage number selected from the group consisting of actual recipe usage (ARU), standard recipe usage (SRU), and forecast recipe usage (FRU) associated with each move number (MN), a material wastage factor (MW), and a material surplus factor (MS) to determine a total amount of material consumption within a fabrication facility.

As shown in FIG. 3, the material usage subdisplay 74 of the BOM display 56 has an MN column 75, a fixed amount column 77, a material ID field 79, a material type field 81, and a % amount field 83. The material usage subdisplay 74 is provided for displaying the MN, wherein the MN is associated with a fixed amount of the representative material shown in an associated material identification field 79 used each time a recipe is executed by the MES, and wherein the MN is calculated by multiplying a percentage of the pre-defined amount of the at least one representative material 28 moved from the warehouse to a piece of fabrication equipment by a fixed unit amount of the representative material consumed or used when each recipe is executed by the MES.

In accordance with an alternative embodiment of the present invention, the pre-defined amount of the at least one representative material is preferably a direct material, wherein the at least one representative direct material is preferably a percentage of a total actual amount of material consumed equaling an amount of a beginning stock of total material within a warehouse plus a withdrawal of direct material moved for consumption within a recipe from the material warehouse upon execution of the recipe by the MES minus an ending stock of the total material. The actual withdrawal of a total amount of material record may be used to define an amount of direct representative material withdrawn from the material warehouse for consumption within a recipe, wherein the amount of representative material disposed within the total amount of material withdrawn from the material warehouse is defined using a central supply. The central supply defines allocation of the direct representative material and of the indirect representative material used within the wafer FAB, wherein the MN of the representative material is preferably associated with a move of the indirect material. The central supply defines the amount of direct and indirect representative material consumed within the wafer fabrication facility by further using the MN in accordance with the recipe usage number, wherein the recipe usage number represents a number of times a recipe is executed by the MES within a time T.

The system 10 uses the associated material consumption algorithm to calculate the total material consumption of representative material within a fabrication facility, the material consumption algorithm selected from the group consisting of an actual total consumption algorithm (ATC=$\Sigma_{Sum\ all\ recipes}$[((MN+B)*(ARU))*MW)]*MS) for determining an actual consumption of the at least one representative material 28 that is consumed during a fabrication process within a time T;

a standard total consumption algorithm (STC=$\Sigma_{Sum\ all\ recipes}$[((MN+B)*(SRU))*MW)]*MS) for determining a standard consumption of the at least one representative material that should be consumed during a fabrication process within a time T; and a forecast total consumption algorithm (FTC=$\Sigma_{Sum\ all\ recipes}$[((MN+B)*(FRU))*MW)]*MS) for determining a forecasted consumption of the at least one representative material to be consumed during a fabrication process within a time T.

The controlling processor cooperates with the material consumption display to selectively display a plurality of user-defined graphical display formats selected from one of a material usage simulation, a material usage trend analysis, and a material usage forecast information chart in accordance with the total amount of material consumption calculated using the associated forecast consumption algorithm.

As shown in a preferred embodiment in FIG. 4, the material usage simulation is shown using a material usage simulation chart 76 by comparing material consumption associated with each one of the following:

an actual material consumption amount associated with at least one material 80 defined within an actual material consumption column 82, a standard material consumption amount 84 associated with at least one material 80 defined within a standard material consumption column 86, and a forecast material consumption amount 88, 89 associated with at least one material 80 defined within a forecast material consumption column 90, 92, wherein each of the forecast material consumption columns 90, 92 is associated with a calendar month.

The actual material consumption column 82 has an actual amount of material consumed in K units of 1000 subcolumn 94 and an actual unit cost subcolumn 96 associated with the actual amount of material consumed in K units of 1000 subcolumn 94.

The standard material consumption column 86 has a standard amount of material consumed in K units of 1000 subcolumn 98 and a standard unit cost subcolumn 100 associated with the standard amount of material consumed in K units of 1000 subcolumn 98.

Each of the forecasted material consumption columns 90, 92 has an associated forecast amount of material consumed in K units of 1000 subcolumn, 102, 104 and an associated forecast unit cost subcolumn 106, 108 associated with each of the associated amount of material consumed in K units of 1000 subcolumns 102, 104.

Additionally, the material usage simulation chart 76 may be used to further compare forecast consumption with actual consumption in column 110, and to further compare standard consumption with actual consumption in column 112.

By monitoring variances within the material usage simulation chart 76, wastage of materials and associated expenses may be eliminated. Both the standard consumption and the forecasted consumption calculated within the material usage simulation chart 76 may be used to more accurately determine material consumption costs within a fabrication facility or within a plurality of fabrication facilities. The material consumption costs may be associated with both accounting and manufacturing costs, wherein every material consumption costs may be reduced by continually updating the material usage simulation chart 76 in accordance with each material consumption algorithm.

As shown in a preferred embodiment in FIG. 5, the material usage trend analysis is a chart 114 used in accordance with the material usage simulation chart 76 (shown in FIG. 4) to determine accuracy of consumption of both a standard amount of material consumption and a forecasted amount of material consumption, wherein a high degree of accuracy for both the standard amount of material consumption and the forecast amount of material consumption provides for good control of material consumption within the wafer fabrication facility. If the accuracy for both the standard amount of material consumption and the forecast amount of material consumption is low, then both values associated with each of the standard amount of material consumption and the forecast amount of material consumption may be adjusted to achieve better control of material consumed within a wafer fabrication facility to prevent material waste and to avoid costs associated with material waste.

In accordance with a preferred embodiment of the present invention, the accuracy of the standard amount of consumption is determined by the formula:

$$1-[(STD-ATC)/ATC],$$

and the accuracy of the forecasted amount of consumption is determined by the formula:

$$1-[(FTC-ATC)/ATC].$$

The material usage forecast 115 provides one or a plurality of months each having an associated calendar date, wherein each associated calendar date is further associated with an amount of material consumption as shown by a darkened field 117, wherein each darkened field 117 represents a total amount of material scheduled to be moved for consumption from the warehouse within a wafer fabrication facility.

As shown in FIG. 7, a method 116 of using an online material consumption monitoring system for monitoring material within a fabrication facility is disclosed herewithin. The method has the steps of:

a) providing a representative material to be consumed within a fabrication facility (step 118);

b) calculating a total amount of the representative material consumed within a wafer fabrication facility in accordance with the material consumption algorithm, wherein the total material consumption algorithm is calculated using a plurality of variables (step 120); and c) benchmarking material usage by each piece of fabrication equipment disposed within one or a plurality of fabrication facilities to help plan for future material usage and to improve fabrication production (step 122).

Preferably, the step of benchmarking material usage by device within one or a plurality of fabrication facilities to help plan for future material usage and to improve fabrication production has the steps of:

using an online material consumption monitoring system to generate at least one of a material usage trend analysis, a material usage simulation, and a material usage forecast information chart (step 152);

The method 116 further having the steps of:

associating the representative material with each of a plurality of recipes, wherein the representative material associated with each of the plurality recipes is consumed within the fabrication facility each time a recipe is executed by an MES (step 124);

using the MES cooperating with a material warehouse having a tracking system to track an actual amount of the representative material withdrawn from the material warehouse to the fabrication facility each time an associated recipe is executed by the MES (step 126); and using the MES in cooperation with an MPS to determine recipe usage associated with the actual amount of representative material within a time T (step 128).

Figure 8:
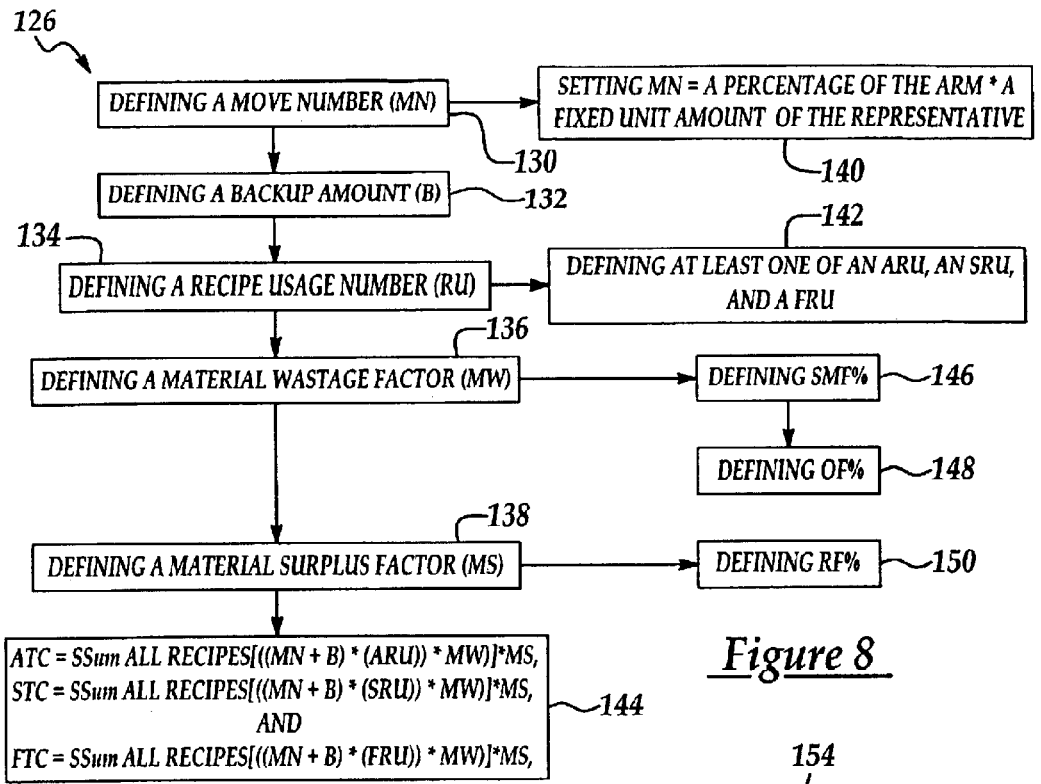
FIG. 8 is a flowchart showing a method of using an MES cooperating with a material warehouse having a tracking system to track an actual amount of a representative material withdrawn from a material warehouse in accordance with the present invention.

In accordance with an alternative embodiment, as shown in FIG. 8, the step of using the MES cooperating with a material warehouse having a tracking system to track an actual amount of the representative material moved from the material warehouse to the fabrication facility each time an associated recipe is executed by the MES (step 126) further has the steps of:

defining a move number (MN), wherein the MN equals the actual amount of the representative material moved from the material warehouse to the fabrication facility each time an associated recipe is executed by the MES (step 130);

defining a backup amount (B) amount of representative material used each time the MES executes a recipe (step 132);

defining a recipe usage number (RU) associated with the number of times a recipe associated with the representative material is executed by the MES (step 134);

defining a material wastage factor (MW) to determine a corrected amount of material consumption in accordance with monitored factors within a fabrication facility (step 136); and defining a material surplus factor (MS) (step 138);

wherein the MN, the B, the WF, and the SF define a plurality of variables used within a total material consumption algorithm.

The step of defining the move number (step 130) preferably has the step of:

setting MN=a percentage of the ARM*a fixed unit amount of the representative material consumed each recipe is executed by the MES (step 140), wherein the MN is defined in a BOM display having a material usage subdisplay.

The step 134 of defining the RU further has the step of:

defining at least one of an actual recipe usage number (ARU), a standard recipe usage number (SRU), and a forecast recipe usage number (FRU) associated with a number of times a recipe associated with the representative material is executed by the MES in accordance with an MPS generated by a CCS (step 142), wherein the ARU equals an actual number of times a recipe associated with the representative material is executed by the MES within a time T, wherein the SRU equals a standard number of times a recipe associated with the representative material should be executed by the MES within a time T, wherein the FRU equals a forecasted number of times a recipe associated with the representative material will be executed by the MES within a time T.

The method 116 further has the step of:

defining a total material consumption algorithm (step 144), wherein the total material consumption algorithm is selected from at least one of an actual total material consumption algorithm (ATC), standard material consumption algorithm (STC), and a forecast material consumption algorithm (FTC) to better control fabrication material costs within a fabrication facility, wherein $ATC = \Sigma_{Sum\ all\ recipes}[((MN+B)*(ARU))*MW]*MS$, wherein $STC = \Sigma_{Sum\ all\ recipes}[((MN+B)*(SRU))*MW]*MS$, and wherein $FTC = \Sigma_{Sum\ all\ recipes}[((MN+B)*(FRU))*MW]*MS$.

The step of defining the MW (136) has the steps of:

defining a standard monitor factor percent (SMF %), wherein the SMF is a number reserved as a factor to account for material wastage occurrences (step 146) such as preventative maintenance and downtime;

defining an other factor percent (OF %) (step 148), wherein the OF % is a number reserved as a factor to account for factors other than the standard monitor factor percent that could affect material usage in production;

wherein MW=(1+standard monitor factor %+other standard factors %), and wherein MW is calculated in accordance with each recipe made to determine an amount of representative material wastage that occurs when each recipe is executed such that preferably, when SMF %=0, and when OF %=0, no material wastage occurs.

The step of defining (MS) (step 138) has the step of:

defining a remain factor % (RF %), the RF % is a percentage of a surplus of representative material that cannot be totally used during production (step 150), wherein the MS is a surplus of representative material available during production, and wherein $MS = 1 + RF\ \%$.

Figure 9:
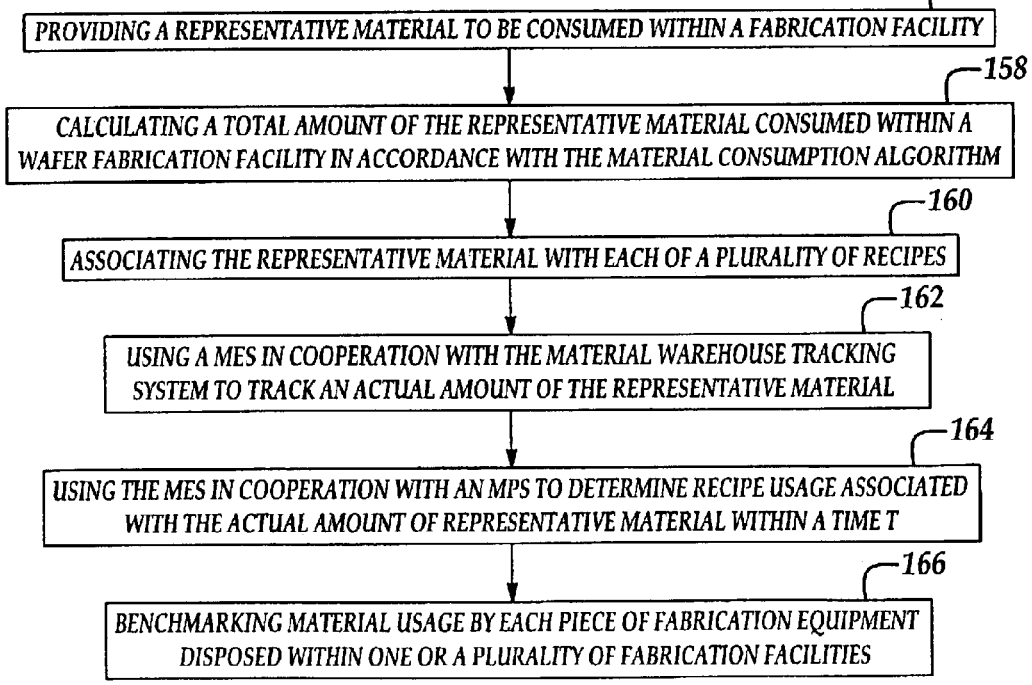
FIG. 9 is a flowchart showing a method of using an online material consumption monitoring system in accordance with the present invention.

In another preferred embodiment, as shown in FIG. 9, a method 154 is provided of using the online material consumption monitoring system 10 for monitoring material within a fabrication facility, the method 154 having the steps of:

a) providing a representative material to be consumed within a fabrication facility (step 156);

b) calculating a total amount of the representative material consumed within a wafer fabrication facility in accordance with a material consumption algorithm, wherein the material consumption algorithm is calculated using a plurality of variables (step 158);

c) associating the representative material with each of a plurality of recipes, wherein the representative material associated with each of the plurality recipes is consumed within the fabrication facility each time a recipe is executed by the MES (step 160);

d) using the MES cooperating with the material warehouse tracking system to track an actual amount of the representative material moved from the material warehouse to the fabrication facility each time an associated recipe is executed by the MES (step 162);

e) using the MES in cooperation with an MPS to determine recipe usage associated with the actual amount of representative material within a time T (step 164); and f) benchmarking material usage by each piece of fabrication equipment disposed within one or a plurality of fabrication facilities to help plan for future material usage and to improve fabrication production (step 166).

From the foregoing, it should be appreciated that an online material consumption monitoring system and method for monitoring material within a wafer fabrication facility is provided.

While a preferred exemplary embodiment has been presented in the foregoing detailed description, it should be understood that a vast number of variations exist and this preferred exemplary embodiment is merely an example, and it is not intended to limit the scope, applicability or configuration of the invention in any way. Rather, the foregoing detailed description provides those of ordinary skill in the art with a convenient guide for implementing a preferred embodiment of the invention and various changes can be made in the function and arrangements of the exemplary embodiment without departing from the spirit and scope of the appended claims.

What is claimed is:

1. An online material consumption monitoring system for monitoring material within a wafer fabrication facility, the online material consumption monitoring system having:
   a) a computer having
      (i) a controlling processor capable of processing material consumption data,
      (ii) a graphical user interface having a build of material ("BOM") display,
      (iii) a browser used to access the graphical user interface and
      (iv) an associated memory means for storing the browser;
   b) a material warehouse having an automated tracking system for tracking each move of a pre-defined amount of at least one representative material from the material warehouse to a piece of fabrication equipment disposed within a wafer fabrication facility, the automated tracking system in operable communication with the controlling processor, wherein the at least one representative material is selected from the group consisting of an indirect material consumed in the indirect processing of an associated product but not consumed within the associated product and a direct material directly consumed within an associated product;
   c) a manufacturing execution system ("MES") for controlling execution of each of a plurality of recipes used to make an associated product, wherein the MES is in operable communication with at least one of the material warehouse automated tracking system and the controlling processor; and
   d) a capacity consumption system ("CCS") for determining future processing capacity of each piece of fabrication equipment disposed within a wafer fabrication facility, the CCS capable of generating a master production schedule ("MPS") associated with at least one of a current, a standard, and a future scheduled recipe move; wherein the controlling processor operates to acquire material move data from the material warehouse and to acquire a recipe usage number associated with the pre-defined amount of at least one representative material from at least one of the MES and the CCS to calculate total material consumption of representative material within a wafer fabrication facility.

2. The online material consumption monitoring system of claim 1, wherein the graphical user interface provides a configurable interface for a user of the computer, the GUI further having a BOM display for displaying BOM data and a material consumption summary display for displaying a plurality of material consumption user-defined graphical display formats.

3. The online material consumption monitoring system of claim 2, wherein the BOM display of the GUI comprises:
   a plurality of columns, the plurality of columns having associated pre-programmed BOM data fields along with a plurality of additional fields into which a user may input BOM data, the plurality of columns having at least one of an equipment type column, a recipe id column, a process column, a product type column, a product id column, and a product quantity column, wherein the BOM display can be dynamically updated in accordance with a change of at lest one of an equipment type a recipe id, a process id, a product type, a product id, and a product quantity; and
   a material usage subdisplay.

4. The online material consumption monitoring system of claim 1, wherein the browser is a java-plug-in installed browser, the browser having a Java applet embedded therewithin for maintaining the BOM data disposed within the associated pre-programmed BOM data fields along and within the plurality of additional fields, wherein the BOM data is dynamically accessed via web-based query reports.

5. The online monitoring system of claim 4, wherein the controlling processor cooperates with the graphical user interface to selectively process the BOM data embedded within the browser by performing an associated material consumption algorithm using a move number MN, a backup amount B, a recipe usage number RU associated with each move number, a material wastage factor, and a material surplus factor to determine a total amount of material consumption within a fabrication facility.

6. The online material consumption monitoring system of claim 2, wherein the BOM display further has a material usage subdisplay for displaying MN, wherein MN is a pre-defined amount of the representative material used each time a recipe is executed by the MES, and wherein the MN is calculated by multiplying a percentage of the pre-defined at least one representative material moved from the warehouse to a piece of fabrication equipment by a fixed unit amount of the representative material consumed or used when each recipe is executed by the MES.

7. The online material consumption monitoring system of claim 5, wherein the recipe usage number is a count of a number of times a recipe is executed by the MES.

8. The online monitoring system of claim 4, wherein an associated material consumption algorithm is selected from the group consisting of:
   an actual consumption algorithm for determining an actual consumption of the at least one representative material that is consumed during a fabrication process;
   a standard consumption algorithm for determining a standard consumption of the at least one representative material that should be consumed during a fabrication process; and
   a forecast consumption algorithm for determining a forecasted consumption of the at least one representative material to be consumed during a fabrication process.

9. The online material consumption monitoring system of claim 8, wherein the controlling processor cooperates with the material consumption display to selectively display a plurality of user-defined graphical display formats selected from one of a material usage trend analysis,
a material usage simulation, and
a material usage forecast information chart in accordance with the total amount of material consumption calculated using the associated material consumption algorithm.

10. A method using an online material consumption monitoring system for monitoring material within a wafer fabrication facility, the method comprising the steps of:
   a) providing a representative material to be consumed within a fabrication facility;
   b) calculating a total amount of the representative material consumed within a wafer fabrication facility in accordance with a material consumption algorithm, wherein the material consumption algorithm is calculated using a plurality of variables;
   c) benchmarking material usage by each piece of fabrication equipment disposed within one or a plurality of fabrication facilities to help plan for future material usage and to improve fabrication production;
      a. associating the representative material with each of a plurality of recipes, wherein the representative material associated with each of the plurality recipes is consumed within the fabrication facility each time a recipe is executed by an MES;
      b. using the MES cooperating with a material warehouse having a tracking system to track an actual amount of the representative material (ARM) moved from the material warehouse to the fabrication facility each time an associated recipe is executed by the MES;
      c. using the MES in cooperation with an MPS to determine a recipe usage number associated with the actual amount of representative material within a time T;
      d. defining a move number (MN), wherein the MN equals the actual amount of the representative material moved from the material warehouse to the fabrication facility each time an associated recipe is executed by the MES;
      e. defining a backup amount (B) amount of representative material used each time the MES executes a recipe;
      f. defining the recipe usage number associated with the number of times a recipe associated with the representative material is executed by the MES;
      g. defining a material wastage factor (MW) to determine a corrected amount of material consumption in accordance with monitored factors within a fabrication facility; and
      h. defining a material surplus factor (MS);
   wherein the MN, the B, the WF, and the SF define a plurality of variables used within the total material consumption algorithm.

11. The method of claim 10, wherein the step of defining a move number comprises the step of:
   setting MN=a percentage of the ARM*a fixed unit amount of the representative material consumed each recipe is executed by the MES, wherein the MN is defined in a BOM display having a material usage subdisplay.

12. The method of claim 11, further having the step of:
   defining at least one of an actual recipe usage number (ARU), a standard recipe usage number (SRU), and a forecast recipe usage number (FRU) associated with a number of times a recipe associated with the representative material is executed by the MES in accordance with an MPS generated by a CCS;
   wherein the ARU equals an actual number of times a recipe associated with the representative material is executed by the MES within a time T,
   wherein the SRU equals a standard number of times a recipe associated with the representative material should be executed by the MES within a time T, and
   wherein the FRU equals a forecasted number of times a recipe associated with the representative material will be executed by the MES within a time T.

13. The method of claim 12, further having a step of:
   defining a total material consumption algorithm, wherein the total material consumption algorithm is selected from at least one of an actual total material consumption algorithm (ATC), standard material consumption algorithm (STC), and a forecast material consumption algorithm (FTC) to better control fabrication material costs within a fabrication facility, wherein $ATC = \Sigma_{Sum\ all\ recipes}[((MN+B)*(ARU)))*MW)]*MS$, wherein $STC = \Sigma_{Sum\ all\ recipes}[((MN+B)*(SRU))*MW)]*MS$, and wherein $FTC = \Sigma_{Sum\ all\ recipes}[((MN+B)*(FRU))*MW)]*MS$.

14. The method of claim 10, wherein the step of defining the MW comprises the steps of:
   defining a standard monitor factor percent (SMF %), wherein the SMF is a number reserved as a factor to account for material wastage occurrences;
   defining an other factor percent (OF %), wherein the OF % is a number reserved as a factor to account for factors other than the standard monitor factor percent that could affect material usage in production;
   wherein MW=(1+standard monitor factor %+other standard factors %), wherein MW is calculated in accordance with each recipe made to determine an amount of representative material wastage that occurs when each recipe is executed.

15. The method of claim 10, wherein the step of defining (MS) comprises the step of:
   defining a remain factor % (RF %), the RF % is a percentage of a surplus of representative material that cannot be totally used during production, wherein the MS is a surplus of representative material available during production, and wherein $MS = 1 + RF\ \%$.

16. The method of claim 10, wherein the step of benchmarking material usage by device within one or a plurality of fabrication facilities to help plan for future material usage and to improve fabrication production comprises the steps of:
   using the online material consumption monitoring system to generate at least one of a material usage trend analysis, a material usage simulation, and a material usage forecast information chart
   determining costs associated with material consumption accounting costs determined by
      i. retrieving an actual withdrawal of material record;
      ii. defining a representative material to track using the actual withdrawal of material record; (look at an identified material in record)
      iii. defining a central supply wherein the defined central supply defines the MN of the representative material how material will be used in production; and
      iv) associating accounting costs with the central supply of the representative material consumed within a fabrication facility manufacturing costs determined by monitoring variance between actual and STD, readjusting STD according to more accurately reflect actual consumption-eliminates waste of materials.

17. A method using the online material consumption monitoring system of claim 1 for monitoring material within a fabrication facility, the method comprising the steps of:
   a) providing a representative material to be consumed within a fabrication facility;
   b) calculating a total amount of the representative material consumed within a wafer fabrication facility in accordance with a material consumption algorithm, wherein the material consumption algorithm is calculated using a plurality of variables;
   c) associating the representative material with each of a plurality of recipes, wherein the representative material associated with each of the plurality recipes is consumed within the fabrication facility each time a recipe is executed by the MES;
   d) using the MES cooperating with the material warehouse tracking system to track an actual amount of the representative material moved from the material warehouse to the fabrication facility each time an associated recipe is executed by the MES;
   e) using the MES in cooperation with an MPS to determine recipe usage associated with the actual amount of representative material within a time T; and
   f) benchmarking material usage by each piece of fabrication equipment disposed within one or a plurality of fabrication facilities to help plan for future material usage and to improve fabrication production.

18. A method using an online material consumption monitoring system for monitoring material within a wafer fabrication facility, the method comprising the steps of:
   a) providing a representative material to be consumed within a fabrication facility;
   b) calculating a total amount of the representative material consumed within a wafer fabrication facility in accordance with a material consumption algorithm, wherein the material consumption algorithm is calculated using a plurality of variables;
   c) benchmarking material usage by each piece of fabrication equipment disposed within one or a plurality of fabrication facilities to help plan for future material usage and to improve fabrication production,
   wherein the step of benchmarking material usage by device within one or a plurality of fabrication facilities to help plan for future material usage and to improve fabrication production comprises the steps of:
      i) using the online material consumption monitoring system to generate at least one of
   a material usage trend analysis, a material usage simulation, and a material usage forecast information chart,
      ii) determining costs associated with material consumption accounting costs determined by:
         retrieving an actual withdrawal of material record;
         defining a representative material to track using the actual withdrawal of material record; (look at an identified material in record)
         defining a central supply wherein the defined central supply defines the MN of the representative material how material will be used in production; and
         associating accounting costs with the central supply of the representative material consumed within a fabrication facility manufacturing costs determined by monitoring variance between actual and STD, readjusting STD according to more accurately reflect actual consumption-eliminates waste of materials.

19. A method using an online material consumption monitoring system for monitoring material within a wafer fabrication facility, the method comprising the steps of:
   a) providing a representative material to be consumed within a fabrication facility, wherein the representative material is selected from the group consisting of an indirect material consumed in the indirect processing of an associated product but not consumed within the associated product and a direct material directly consumed within an associated product;
   b) calculating a total amount of the representative material consumed within a wafer fabrication facility in accordance with a material consumption algorithm, wherein the material consumption algorithm is calculated using a plurality of variables; and
   c) benchmarking material usage by each piece of fabrication equipment disposed within one or a plurality of fabrication facilities to help plan for future material usage and to improve fabrication production.

20. An online material consumption monitoring system for monitoring material within a wafer fabrication facility, the online material consumption monitoring system having:
   a computer having a controlling processor capable of processing material consumption data; and
   a material warehouse having an automated tracking system for tracking each move of a pre-defined amount of at least one representative material from the material warehouse to a piece of fabrication equipment disposed within a wafer fabrication facility, the automated tracking system in operable communication with the controlling processor, wherein the at least one representative material is selected from the group consisting of an indirect material consumed in the indirect processing of an associated product but not consumed within the associated product and a direct material directly consumed within an associated product.

* * * * *